United States Patent [19]

Hanford, Jr. et al.

[11] 4,336,225
[45] Jun. 22, 1982

[54] WATER DECONTAMINATION APPARATUS

[76] Inventors: William E. Hanford, Jr., 5613 Overlea Rd.; William E. Hanford, Sr., 4956 Sentinel Dr., both of Bethesda, Md. 20016

[21] Appl. No.: 257,176

[22] Filed: Apr. 24, 1981

Related U.S. Application Data

[63] Continuation of Ser. No. 45,278, Jun. 4, 1979, abandoned, which is a continuation of Ser. No. 727,168, Sep. 27, 1976, abandoned.

[51] Int. Cl.³ ............................................. B01D 11/02
[52] U.S. Cl. .................................... 422/106; 422/282
[58] Field of Search ............... 422/106, 110, 111, 261, 422/282; 210/101, 104, 202, 103, 205, 169; 137/268

[56] References Cited

U.S. PATENT DOCUMENTS

| | | | |
|---|---|---|---|
| 2,967,763 | 1/1961 | Dornan | 210/169 |
| 2,984,250 | 5/1961 | Foster | 422/110 |
| 3,129,172 | 4/1964 | Dickey | 210/169 |
| 3,181,731 | 5/1965 | Ellis | 422/106 |
| 3,378,027 | 4/1968 | Fredericks | 422/106 |
| 3,474,817 | 10/1969 | Bates | 210/169 |
| 3,595,395 | 7/1971 | Lorenzen | 210/169 |
| 3,727,760 | 4/1973 | Soriano et al. | 210/101 |
| 3,864,090 | 2/1975 | Richards | 210/169 |
| 3,912,627 | 10/1975 | Tepas | 210/169 |

FOREIGN PATENT DOCUMENTS 874149 6/1971 Canada.

Primary Examiner—Hiram Bernstein
Attorney, Agent, or Firm—Martin Novack

[57] ABSTRACT

An apparatus is provided on a contaminated water source that readily effects chemical purification of the water by providing an automatic means of manufacturing a stock solution of chemicals, storing the stock solution, and then injecting the solution into the line. The injector is set to operate at peak efficiency, and accuracy is obtained by controlling the strength of the stock solution. A relatively small amount of water is chemically treated and then is mixed with a large quantity of contaminated water.

6 Claims, 9 Drawing Figures

WATER DECONTAMINATION APPARATUS

This application is a continuation, of application Ser. No. 45,278, filed June 4, 1979, now abandoned which was, in turn, a continuation of application Ser. No. 727,168, filed Sept. 27, 1976 now abandoned.

This invention relates to a water treatment apparatus and, more particularly, to an apparatus for chemically treating contaminated water.

The necessity for purifying water intended for human consumption has long been recognized. A contaminated water supply can be the source of many diseases and, in heavily populated areas where a large number of people consume water from the same source, diseases such as dysentery and typhoid can reach epidemic proportions. These and most other waterborne diseases fortunately have been eliminated in most of the urban areas of the world through the use of sophisticated water purification plants. However, these same solutions are not as applicable to rural areas or developing nations. High cost, sparse population, lack of energy and lack of skilled labor preclude installation of effective, sophisticated water systems. It is to this problem, namely, providing safe, potable water to the people of rural areas that the present invention is directed.

In approaching this problem, a research and development program was initiated to discover a water purification system that could provide maximum efficiency in purification, process a relatively large volume of water, function continuously in a pressure system, and could be operated by unskilled labor. This research and development program was extremely successful and resulted in the present invention that accomplishes all of the aforesaid elements.

This objective is strongly similar to the objective of Hanford & Soriano in their U.S. Pat. No. 3,727,760 issued Apr. 17, 1973. However, in the Hanford & Soriano patent, it is impossible to apply the disinfectant to a system under pressure since the treated water is required to free fall from the apparatus into an open tank. The present invention overcomes this drawback and provides a system which can deliver treated chemical into a pressurized line and yet incorporates all of the aforementioned desired advantages; namely, one that could process a relatively large volume of water in a short span of time, could function continuously, requires no electrical power since electrical power is not readily available in rural areas, and could be operated by unskilled labor. Most surprisingly, the present invention provides a very high degree of accuracy in the feeding of chemical agents.

Over the years, various techniques have been suggested for the chlorination of water to bring about disinfection in small pressure equipment. The large-size equipment, which uses elemental chlorine or electrolytic produced chlorine, is unsatisfactory for this type of service. Elemental chlorine is hazardous and requires a great deal of instrumentation to properly control the addition rate. The electrolytic units are unreliable in that they are easily fouled and they, too, require experts to maintain them in operation condition.

Solutions of sodium hypo chlorite have been used and are perhaps the most satisfactory, but because sodium hypo chlorite can only be prepared with a reasonable shelf life in dilute solutions, they are expensive to transport and bulky to handle. Even these dilute solutions of sodium hypo chlorite deteriorate too quickly to allow a good mechanical system to be offered for rural use.

Perhaps the most difficult feature of prior equipment arises from the fact that often inaccurately made or quickly degrading stock solution is made by hand or bought, and this solution is then pumped into the water system by an injector. The point of steady control and setting in such systems is the injector, which must be adjusted to match the standardized available solution. Moreover, to obtain any accuracy in this style of injection, electrical proportionating pumps must be employed. These pumps have the additional disadvantage of over-chlorinating one segment of water and then putting no chlorine in the next segments. It is not until these segments are totally mixed that any accuracy of overall chlorine concentration is obtained. Since this mixing may not occur, this type of batch chlorinating is undesirable. Finally, these pumps can easily be jammed by solid deposits, which often precipitate in the stock solution.

Before discussing the design of our equipment, it is important for the public to realize that when hypo chlorous acid solutions are used in the sanitation of water, the concentration of hypo chlorite ion residing just before the water is to be consumed by humans must be low and accurately controlled. It is generally preferred that the concentration of hypo chlorite ion be less than 1 ml/l at the time of human consumption. If there is less than this, then the water could be contaminated with micro-organisms. If it is more than this, it will have a bad taste and be unsuitable for human consumption. In the equipment that is described in this invention, a reliable system, simple to operate, gives chlorine-containing solutions with an accuracy of less than 0.5 ml/l. The feeder for making the solution used in this invention is basically the design of Hanford & Soriano, U.S. Pat. No. 3,727,760, issued Apr. 17, 1973. The accuracy of this equipment for feeding hypo chlorite ion to water is now well established. But, in this case, instead of preparing a dilute solution, a relatively concentrated solution is prepared having a hypo chlorous acid concentration between 200 and 500 ml/l. This is accomplished as outlined in the examples given in this patent. The Hanford & Soriano feeder is further modified in order to handle the flow rates that are met in the trade. The flow rates met in the trade vary between a few gallons per minute to hundreds of gallons per minute, and the equipment must be able to handle such wide variations. The pressures also available are from 20 to 100 per square inch, which may require variation in the Hanford & Soriano equipment. The Hanford & Soriano feeder may be modified to suit these variations by the use of pressure-regulating devices and orifice variations described more completely herein.

Generally, this invention comprises the use of a modified Hanford & Soriano feeder or equivalent to prepare a solution of hypo chlorous acid and, then, the addition of this solution to a pressure line by means of any suitable injector mechanism. Surprisingly, by the use of these components, unanticipated desirable results are obtained; namely, that the injector can be set to operate at peak efficiency and accuracy be obtained by varying the strength of the solution to be injected. This allows less precise non-electric injection mechanism, a desirable characteristic. Further, some of these non-electric injectors have constant feed potential, thereby eliminating the batch-segment problem. The modified Hanford & Soriano feeder, surprisingly, can be modified to make solutions from 1 ml/l to several percent with highly reliable repetitive results. This allows for the easy preparation of accurate feed solutions without the requirement of time or labor on the part of the user. Since the solution can be frequently made to assure consistent strength and since the solution is generally weaker than commercially made solutions, the problem of sediments in the pumps is greatly reduced.

The modified Hanford & Soriano feeder is ideal for rural use because it employs calcium hypo chlorite tablets of 70 percent available chlorine content. This is nearly six times the amount of hypo chlorite that can be obtained from one round of sodium hypo chlorite solution. Thus, the shipping problems are greatly reduced. The calcium hypo chlorite tablets used in the Hanford & Soriano invention are stable, easy to handle and offer no hazard to the user. In order to further increase the accuracy of the hypo chlorite ion going into the solution, this invention uses a bypass to pick up the hypo chlorous acid solution having a concentration of 200 to 500 ml/l. Moreover, by passing between one part in 10 to 1 part in 50 of the water in the system through the bypass, we are able to control the concentration in the final product with an accuracy of less than 0.5 ml/l. It is apparent to those skilled in the art that by using this dilution principle, we can reduce any errors in the concentration of the feed by a factor of from 10 to 50.

Therefore, by using non-electric, simple equipment, accurate and constant chlorination can be obtained from readily available components.

BRIEF DESCRIPTION OF THE DRAWINGS

More specifically, water from a source under pressure is run into a Hanford & Soriano chlorinator or equivalent. Referring to FIGS. 1 and 2, the water would enter at the point marked 1. Valve 15 would be opened fully, as would be the valve 14 on line 12. Valve 44 would be opened and hopper 37 lowered such that a solution of between 10 ml/l and 10 percent would be made in a crock 100 placed below exit 33 port of the Hanford & Soriano unit. Cam 56 with rod 54 and ball 23 would float in this crock. From a point 101 on the wall of this crock, a hose 104 would lead to an injector 102 placed in a line of pressurized running water 103.

In operation, as water passes through line 103, injector 102, places the solution in crock 100 into the line proportional to the flow of water in the line. As the solution in crock 100 decreases, ball 23 triggers the Hanford & Soriano feeder and refills the tank with new solution of chemicals. Injector 102 may be any standard type of pump, i.e., diaphragm, centrifugal, or other means, and this pump or injector can be powered by electric, gas, water, air or steam motor. Moreover, and more commonly, a venturi style of injector can be used. However, any forms of injectors well known to those in the art can be used.

The solution in crock 100, which is made by the Hanford & Soriano feeder, can use any number of chemical compounds, including but not limited to high test calcium hypo chlorite, trichlorcynaurate, 1,3,4,6 tetrachlorogylcoluril and mixtures of this compound with calcium hypo chlorite, complex phosphates for pH adjustment, low soluble salts of sodium carbonate such as trontite and graphite, expended components containing fluoride, chloride, bromide, or iodide ions. Mixtures of sodium fluoro silicate with other low soluble salts are also applicable for this equipment. Aluminum sulphate or any of the alums are ideal for assisting in the clarification of water. Alumia of ferric salts are also useful in removing arsenic that may be present in drinking water. The only requirement is that the compound have a relatively slow solubility in water.

In a particularly preferred embodiment, a pressure regulator 3 is applied prior to the Hanford & Soriano feeder. Since the pressures in the line 1 can vary from 250 psi to 10 psi, the pressure regulator supplies to the unit a constant pressure, generally between 30 and 5 psi to the unit. Surprisingly, this pressure regulation provides more accurate chlorination solution than the Hanford & Soriano feeder by controlling the flows into the unit.

Figure 1:
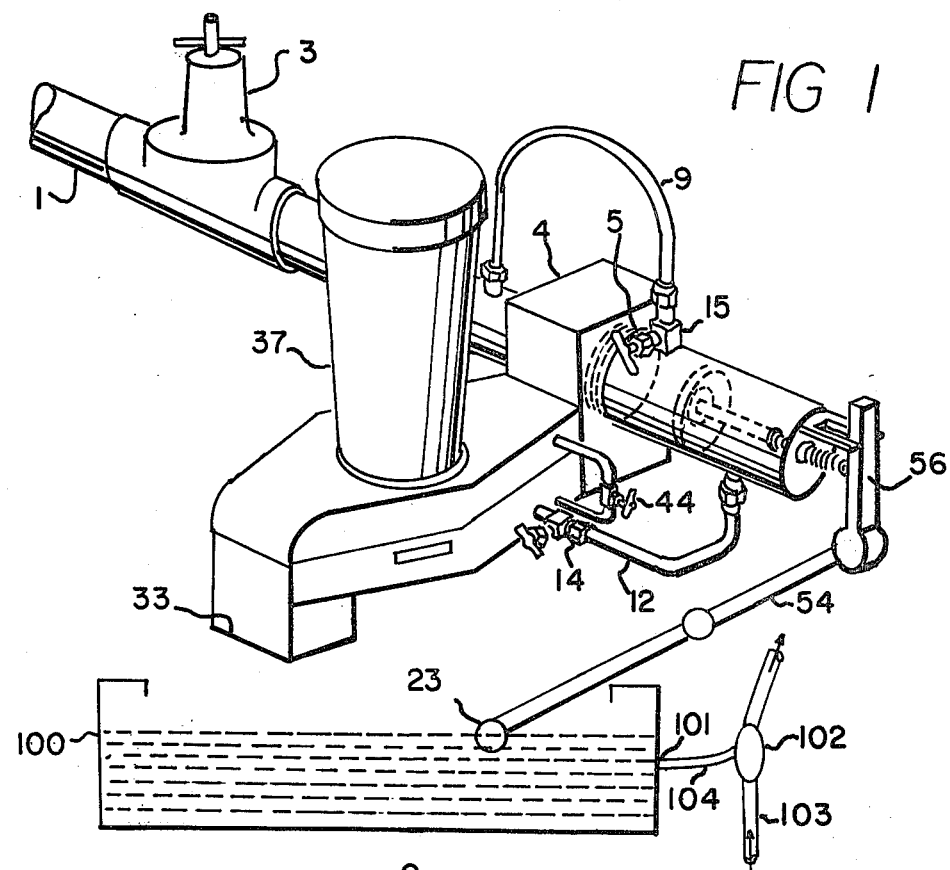
FIG. 1 is an elevational perspective view of an apparatus in accordance with an embodiment of the invention.
Figure 2:
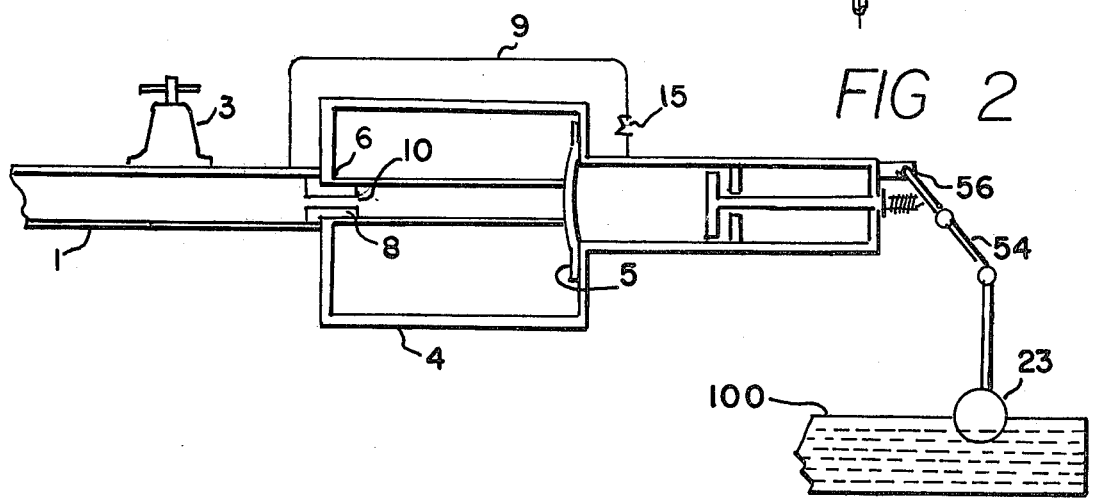
FIG. 2 is a cross sectional view of a portion of the apparatus of FIG. 1.

Still referring to FIGS. 1 and 2, the Hanford & Soriano feeder is also modified by changing the size of orifice 6 in pipe 1 at some point post to tube 9 and prior to diaphragm 5. This is generally accomplished by the insertion of a plug 8 that looks like a mushroom with a hole 10 drilled in the center of the mushroom and the stem. The diameter of this hole 10 then controls the amount of water that passes into the main body of the valve 4 or through the bypass 9 that operates the diaphragm 5.

In actual practice, three different hole sizes 10 have been found satisfactory to cover the entire range of pressures and flow rates met in the field. The use of these plugs also increases the percentage of flow over line 9 and thereafter through line 12 into the base of the Hanford & Soriano feeder, thus increasing further the concentration of solution fed into crock 100.

Figure 3:
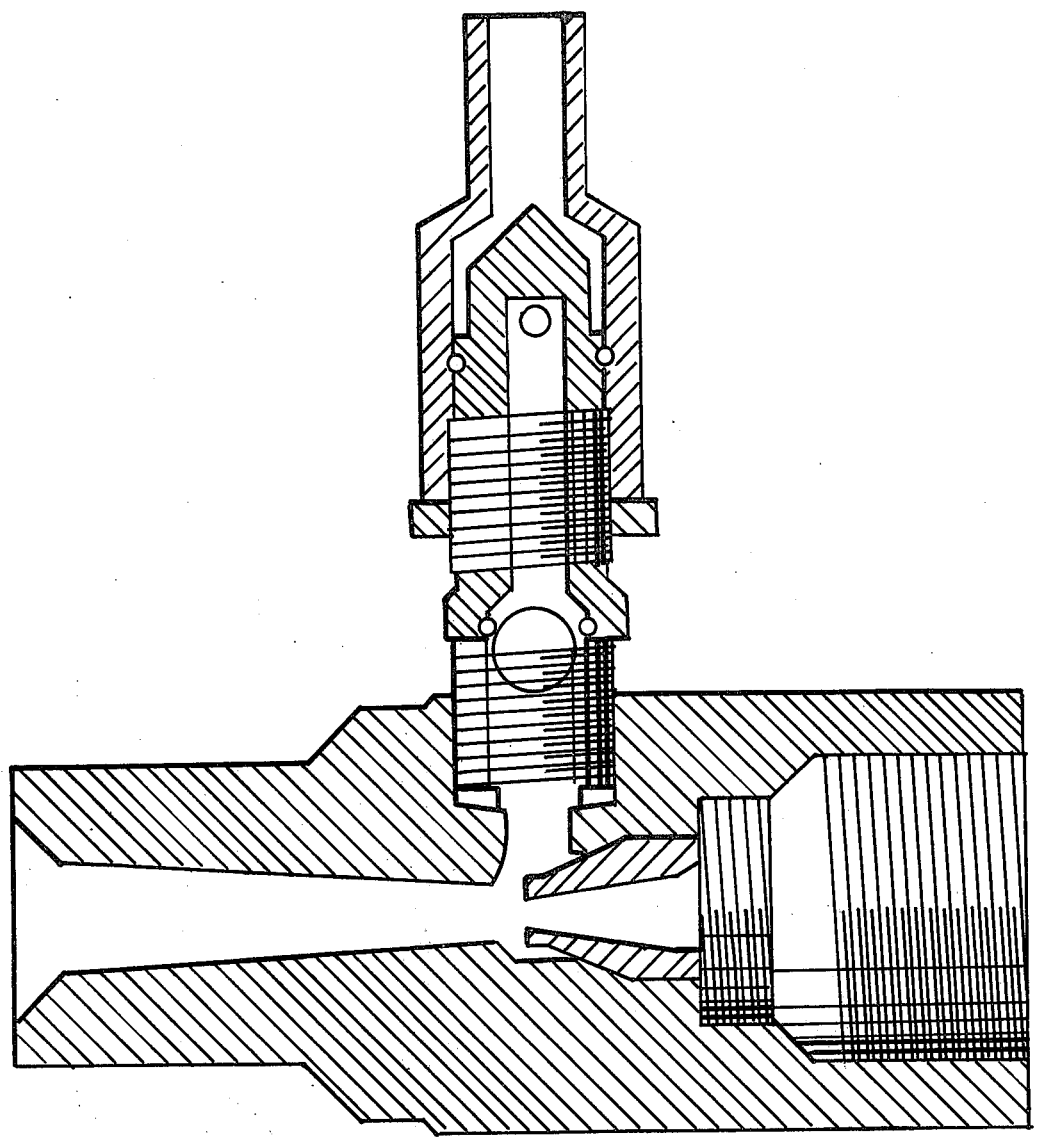
FIG. 3 is a cross sectional view of a venturi that can be used in the present invention.

The Hanford & Soriano feeder is adjusted by means of hopper 37, valve 44 and valve 14 on line 12 to make a solution of between 50 to 1,000 ml/l solution in the crock 100. The exact strength of the solution to be manufactured is determined by the demand for the chemical in the final line 103. The solution from the Hanford & Soriano feeder falls into a crock of between 10 and 50 gallons. The Hanford & Soriano feeder is adjusted such that the solution is remade before the solution reaches point 101 where the solution is drawn from the crock. Line 101 is then connected to a proportionate feed venturi of the type shown in FIG. 3.

Figure 4:
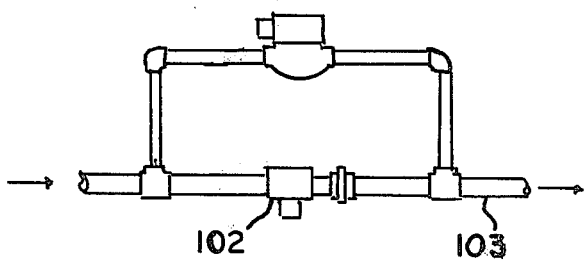
FIGS. 4–9 illustrate the manner in which venturies and other equipment can be installed in conjunction with the present invention.
Figure 5:
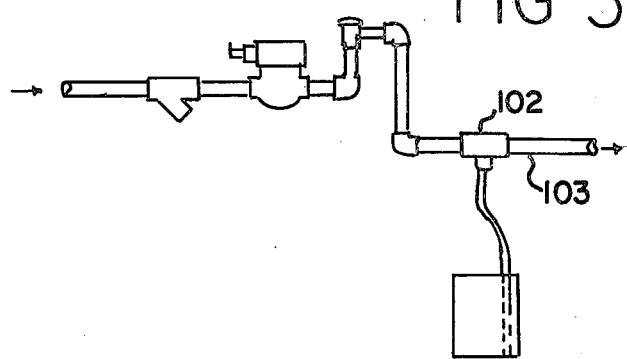

FIGS. 4 and 5 show the simplest means of installing such venturi 102 in line 103.

Figure 7:
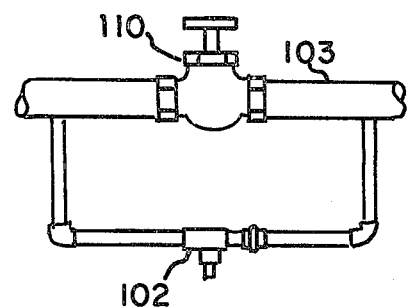

If the line 103 is large, a small venturi injector may be used in a bypass line as shown in FIG. 7. In this case, a valve 110 or other restriction must be placed in the main line 103 to provide sufficient differential to operate the venturi injector 102. The hand valve 110 is throttled until the injector 102 starts to function, thus matching the injector to the unknown capacity of the system as shown in diagram 7. As an additional advantage of this type of bypass injection, any small variations in input of chlorine by the injectors in the bypass line will have a significantly reduced variation in the larger main line. In other words, if the bypass line represents 1/10 of the flow, a variation of 1.0 ml/l in this line will have only a variation of 0.1 ml/l.

Figure 6:
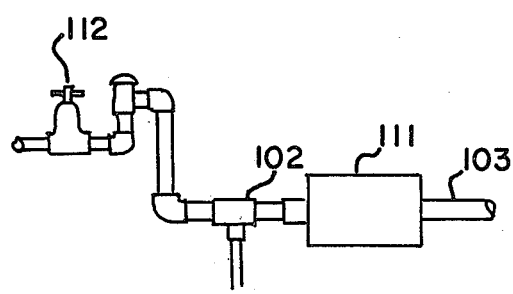

FIG. 6 shows a typical installation of a venturi 102 injector on the suction side of the pump 111. For an injector to operate under widely fluctuating water pressure, the water flow rate must vary with the pressure. If the injector is installed in the suction line to a constant displacement pump, the water flow rate is practically constant, regardless of supply pressure changes. Therefore, a pressure regulator 112 should be installed ahead of it.

Figure 8:
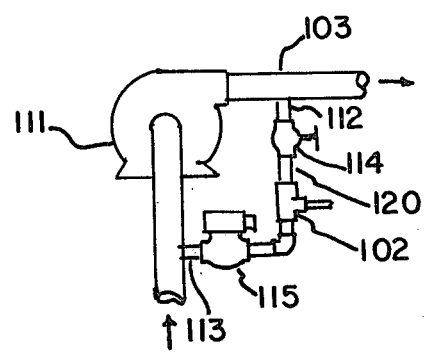

A particularly preferred embodiment is shown in FIG. 8, where the venturi 102 is placed in a line across the pump 111, i.e., the pickup point 112 for the bypass line 120 is on the pressure side of a pump and the return side 113 is on the suction side of a pump. This is particularly useful, also, on jet pumps, where the return line is the down line of the jet pump.

Still referring to FIG. 8, the hand valve 114 is recommended so that the bypassed water can be throttled to the minimum rate required to work the injector. The optional solenoid valve 115, or a manual valve at the same location, may be used to stop injection while the pump is running.

Figure 9:
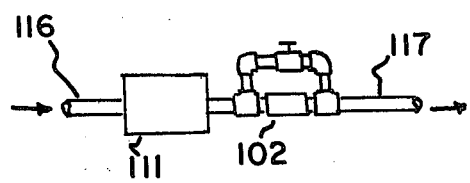

FIG. 9 is another possible embodiment. Injectors are usually placed in the pump 111 suction line 116 rather than the discharge line 117 because the water pressure loss through the injector is a percentage of the pressure. Therefore, the higher the pressure, the greater is the pressure loss in pounds per square inch. However, placement in the discharge line is easy. The pressure ratio from inlet to exit side of the venturi must exceed 2:1 for the equipment to operate; i.e., avoid back pressure.

In operations where the injection must be made on the pump discharge side and where the pressure ratio necessary to operate a venturi are unavailable, proportioning pumps driven by water have been found to be most acceptable as typified by the "Anderson Proportioning Pumps", which are well known in the art. Additionally, venturis can be used in this segment by the addition of a small pressure-raising pump prior to the venturi. This pump is used to increase the pressure to the desired ratio. If practical, standard electrical proportionating pumps can be used for the injection.

More importantly, in all cases the injectors of whatever nature are set to operate under fixed conditions, i.e., the point at which they operate best. For example, venturi operate best only under a static condition. So, it is not possible with a venturi to adjust the rate of flow without a great loss in efficiency. There are venturi in which the rate of flow can be changed, but they are expensive and not as reliable in operation as the conventional simple venturi.

In order to vary the rate of addition of hypo chlorous acid into the system, we operate the venturi under its optimum operating conditions and leave it set at these optimum operating conditions. The concentration of hypo chlorite acid needed to sanitize the water and still exit at less than 0.5 ml/l is obtained by varying the concentration of the hypo chlorous acid solution prepared by the Hanford & Soriano feeder. Changes in the concentration of hypo chlorous acid in this feeder are relatively simple by changing the setting of the hopper 37. If the hopper is screwed down further, the concentration will increase, and if it is screwed in the opposite direction, the tablets are not as deeply immersed in the water stream and hence lower concentrations are achieved. By a few simple adjustments it is possible to set the concentration of the feed prepared by the Hanford & Soriano feeder, the setting of the venturi, the type of water, so that the concentration of hypo chlorous acid is less than 0.5 ml/l. The venturi smooths out the pulsing of the reciprocity pump. This type of system is such preferred to a proportionating pump.

As a specific example, the system was connected to a shallow well of contaminated water. The water was pumped from this well by a centrifugal pump having a two-inch line and was extracting the water by suction from the well at a rate of approximately 75 gallons per minute. A "T" was placed in the line prior to the centrifugal pump. From this "T" a ¾ line was drawn and connected to a ball valve and then a ¾ inch Watts pressure regulator. The Watts regulator was adjusted to hold 12 pounds. From the regulator, the water entered a Hanford & Soriano feeder, from which a solution of approximately 400 psi entered a 30-gallon crock. A line was attached to the crock ⅓ up from the base and the feeder was adjusted to keep the tank ½ full. Another "T" was placed directly after the pump and this second ½ inch "T" had, in order, a gate valve, one stage injector, and a ball valve. This line was then "T'd" back into the main line on the suction side of the pump. The injector was adjusted to that it operated smoothly, and it was then connected to the solution tank. The injector pulled the solution from the tank and injected it into the line. From empirical test it was determined that the injector needed to draw a 450 ml/l solution into the line to obtain proper chlorine residuals in the system. The Hanford & Soriano device was then adjusted by lowering the hopper to obtain this strength solution.

In operation, when the main line centrifugal pump operated, a suction was created in the injector that added the chemicals from the crock. As the level in the crock decreased, the Hanford & Soriano device turned on, remade a strong solution, turned off, and waited for that solution to be used. The following table shows the accuracy of the equipment at this demonstration.

| Time in Hours | Cl₂ at Far Point In Line ml/l |
| --- | --- |
| 1 | 0.1 |
| 2 | 0.1 |
| 3 | 0.1 |
| 4 | 0.1 |
| 5 | 0.2 |
| 6 | 0.1 |
| 7 | 0.1 |
| 8 | 0.2 |
| 9 | 0.1 |
| 10 | 0.1 |
| 11 | 0.1 |
| 12 | .01 |
| 24 | 0.1 |
| 48 | 0.1 |
| 72 | 0.1 |

What is claimed is:

1. Apparatus for automatically injecting a chemical into a pressurized line of contaminated water comprising:

an erosion feeder containing a supply of said chemical in solid form, for receiving water from said line under pressure and operative under control of a control mechanism to produce a solution of said chemical of adjustable strength; said erosion feeder including a pair of chambers, means for dividing the water from said line to flow through each of said chambers, an adjustable holder containing said chemical and extending into one of said chambers, such that the portion of water which flows through said one of said chambers is subjected to said chemical and erodes said chemical, and means for recombining the flow through said chambers to obtain said solution of adjustable strength; said erosion feeder including flow restrictor means for increasing the amount of water in said one of said chambers so as to produce solution of increased concentration;

a crock for holding solution produced by said erosion feeder;

passive injection means for injecting solution from said crock into said line; and volume sensing means for activating and deactivating said control mechanism as a function of the volume of solution in said crock.

2. Apparatus as defined by claim 1 wherein said passive injection means includes a venturi connected in said line and a tube for coupling said crock to said venturi.

3. Apparatus as defined by claim 1 wherein said chemical in solid form is a source of hypochlorous ion, and wherein the solution formed by said erosion feeder has a hypochlorous acid concentration between about 200 and 500 ml/l.

4. Apparatus as defined by claim 2 wherein said chemical in solid form is a source of hypochlorous ion, and wherein the solution formed by said erosion feeder has a hypochlorous acid concentration between about 200 and 500 ml/l.

5. Apparatus as defined by claim 4 wherein said volume sensing means is a rod and float assembly.

6. Apparatus as defined by claim 5 wherein said control mechanism is operative to enable operation of said solution producing means whenever the volume of solution in said crock fails below a prescribed minimum volume and to disable operation of said solution producing means whenever the volume of solution in said crock rises above a prescribed maximum volume.

* * * * *